US010751665B2

(12) United States Patent
Kirkbride

(10) Patent No.: US 10,751,665 B2
(45) Date of Patent: Aug. 25, 2020

(54) PERSONAL OXYGEN ENHANCED BREATHING SYSTEM

(71) Applicant: The Boeing Company, Chicago, IL (US)

(72) Inventor: David W. Kirkbride, Allyn, WA (US)

(73) Assignee: The Boeing Company, Chicago, IL (US)

( * ) Notice: Subject to any disclaimer, the term of this patent is extended or adjusted under 35 U.S.C. 154(b) by 182 days.

(21) Appl. No.: 15/881,848

(22) Filed: Jan. 29, 2018

(65) Prior Publication Data

US 2019/0232217 A1 Aug. 1, 2019

(51) Int. Cl.
| | |
|---|---|
| *B01D 53/02* | (2006.01) |
| *B01D 53/22* | (2006.01) |
| *B01D 63/12* | (2006.01) |
| *F04B 45/047* | (2006.01) |
| *F04B 53/20* | (2006.01) |
| *A62B 7/10* | (2006.01) |
| *F04B 41/06* | (2006.01) |
| *F04B 39/16* | (2006.01) |
| *F04B 45/04* | (2006.01) |
| *F04B 53/10* | (2006.01) |

(52) U.S. Cl.
CPC .............. *B01D 53/226* (2013.01); *A62B 7/10* (2013.01); *B01D 53/227* (2013.01); *B01D 63/12* (2013.01); *F04B 39/16* (2013.01); *F04B 41/06* (2013.01); *F04B 45/043* (2013.01); *F04B 45/047* (2013.01); *F04B 53/20* (2013.01); *B01D 2256/12* (2013.01); *B01D 2257/102* (2013.01); *B01D 2259/4541* (2013.01); *B01D 2259/4575* (2013.01); *B01D 2313/243* (2013.01); *B64D 2231/02* (2013.01); *F04B 53/10* (2013.01)

(58) Field of Classification Search
CPC .................. A62B 7/10; B01D 2256/12; B01D 2257/102; B01D 2259/4541; B01D 2259/4575; B01D 2313/243; B01D 53/226; B01D 53/227; B64D 2231/02; F04B 39/16
See application file for complete search history.

(56) References Cited

U.S. PATENT DOCUMENTS

| | | | |
|---|---|---|---|
| 6,165,431 A | 12/2000 | Mackay et al. | |
| 7,682,422 B2 | 3/2010 | Tanihara | |
| 8,658,089 B2 | 2/2014 | Berentsveig | |
| 2013/0233169 A1* | 9/2013 | Daniels, Jr. | ............ B01D 53/30 95/8 |
| 2015/0367275 A1* | 12/2015 | Hilbig, Jr. | .......... B01D 53/0415 95/95 |

OTHER PUBLICATIONS

Kerns, J. "Making Piezoelectronics Work for You," Machine Design, Mar. 1, 2016, Informa USA, Inc., pp. 36-41.

* cited by examiner

*Primary Examiner* — Christopher P Jones
(74) *Attorney, Agent, or Firm* — Coats & Bennett, PLLC

(57) ABSTRACT

An apparatus, systems comprising the apparatus, and methods of using and making the apparatus are disclosed, with the apparatus comprising an inlet, at least one oxygen membrane separator in communication with the inlet and in communication with an ambient airflow, with the ambient airflow comprising an ambient oxygen concentration, at least one piezoelectric pump in communication with the at least one oxygen membrane separator, and an outlet for emitting an enhanced oxygen concentration airflow.

20 Claims, 9 Drawing Sheets

PERSONAL OXYGEN ENHANCED BREATHING SYSTEM

TECHNOLOGICAL FIELD

The present disclosure relates generally to gas separation. More particularly, the present disclosure relates to devices, systems, and methods for increasing oxygen concentration and directing an increased oxygen concentration to a user or a zone inhabited by a user.

BACKGROUND

In various environments, the oxygen content in ambient air is altered just enough to have a perceptible effect on a human. For example, at higher altitudes on land, performance levels during physical exertion or even when a body is at rest may be impacted by a drop in oxygen concentration in ambient air of even less than 1 percent. Further, in enclosed spaces where air is conditioned and circulated, including, buses, trains, buildings, etc., minor fluctuations in oxygen content can occur. In addition, during air travel, cabin pressurization and ambient air circulation is optimized to deliver oxygen content to passengers approaching or substantially approximating oxygen levels on land. In most instances, such minor variations in air component composition and, in particular, oxygen concentration are not noticed by, or otherwise do not adversely impact, air passengers. Some passengers, however, have experienced so-called "jet lag", typically on longer flights that may be exacerbated in individuals having a physiological sensitivity to oxygen concentration changes in their environment.

SUMMARY

The present disclosure includes apparatuses, systems and methods for increasing oxygen concentration of ambient air, and delivering air with an enhanced oxygen concentration to a user and/or a zone inhabited by a user.

According to one aspect, an apparatus is disclosed comprising an inlet, a gas separation filter in communication with the inlet and in communication with an ambient airflow, with the ambient airflow comprising an ambient oxygen concentration, a piezoelectric pump in communication with the gas separation filter, and an outlet configured to emit an enhanced oxygen concentration airflow from the oxygen enhancement unit. The oxygen concentration in the enhanced oxygen concentration airflow is greater than the ambient oxygen concentration.

Another aspect is directed to a system for enriching oxygen comprising an oxygen concentration enhancement unit comprising an inlet, a gas separation filter, a piezoelectric pump in communication with the gas separation filter, and an outlet for emitting an enhanced oxygen concentration airflow. The system further comprises a delivery device in communication with the outlet and a power source in communication with system for powering the piezoelectric pump.

A further aspect is directed to a method comprising delivering an amount of ambient air to an inlet of an oxygen concentration enhancement unit. The unit comprises a gas separation filter and a piezoelectric pump in communication with the gas separation filter. The method further comprises engaging the piezoelectric pump to direct an airflow through the gas separation filter and directing ambient air into the gas separation filter to form an enhanced oxygen concentration airflow. Still further the method comprises increasing an oxygen concentration of the ambient air delivered to the unit to an oxygen concentration exceeding the ambient oxygen concentration in the ambient air.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
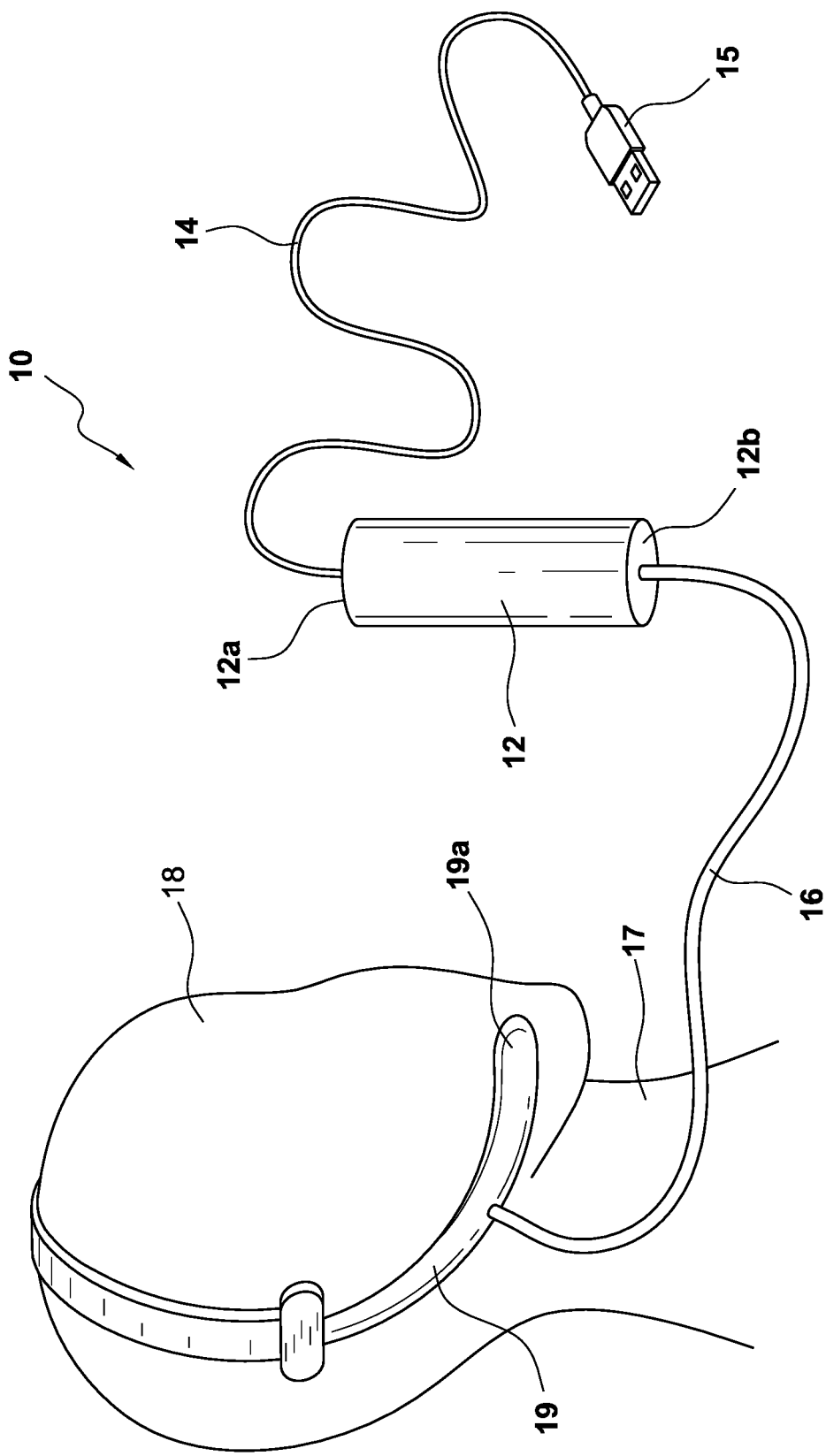
Figure 2:
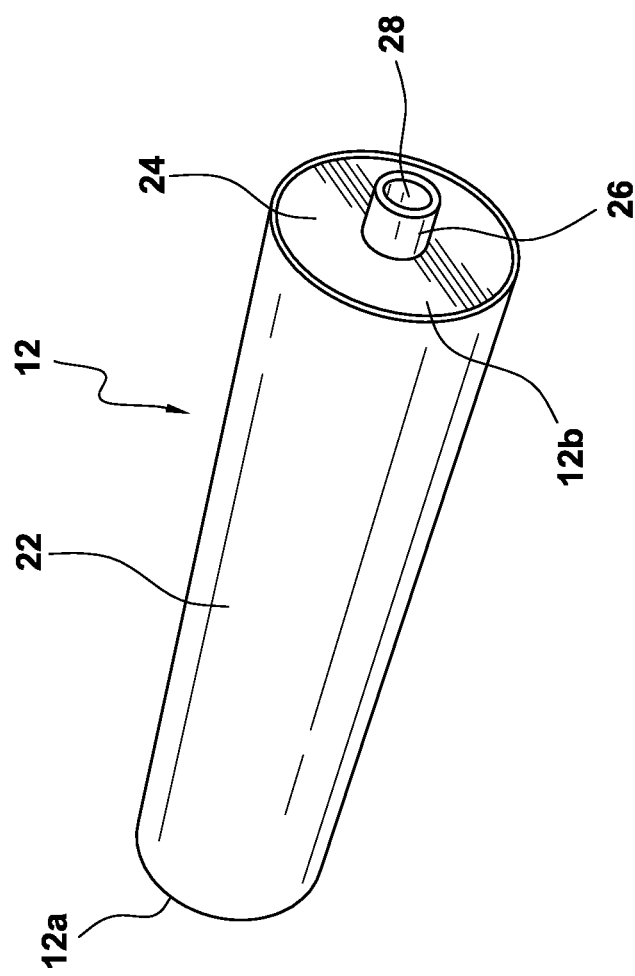
Figure 3:
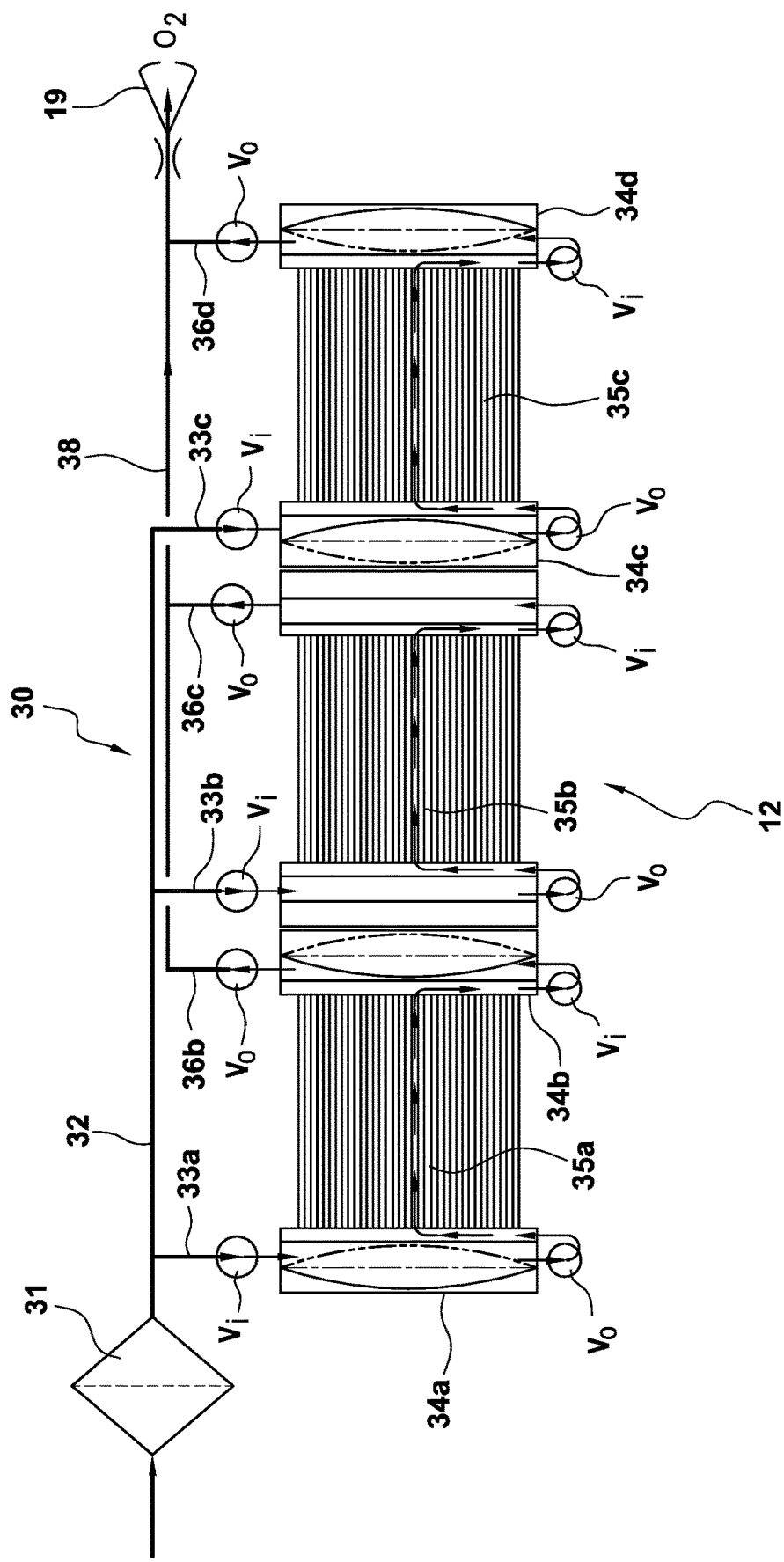
Figure 4:
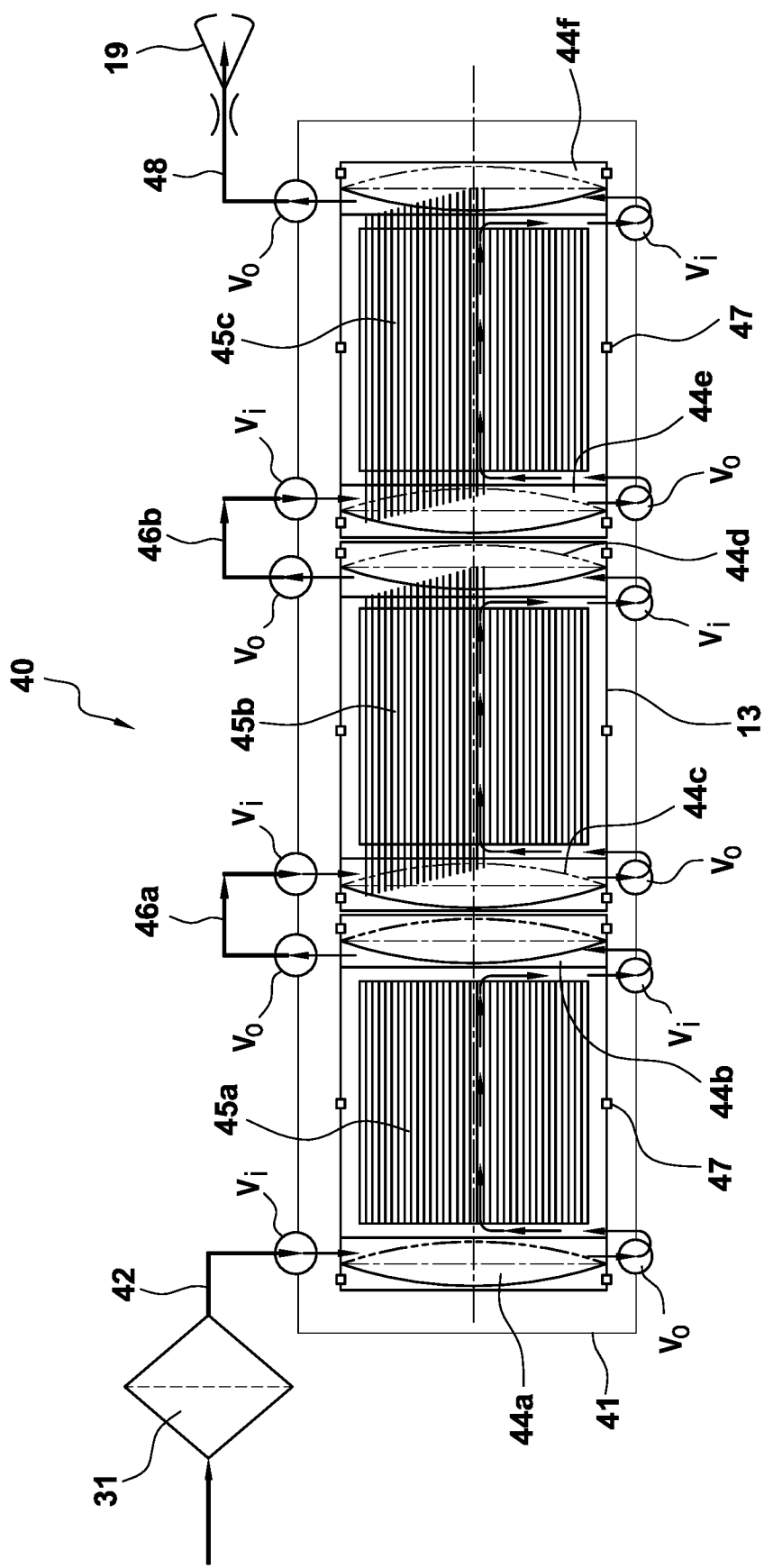
Figure 5:
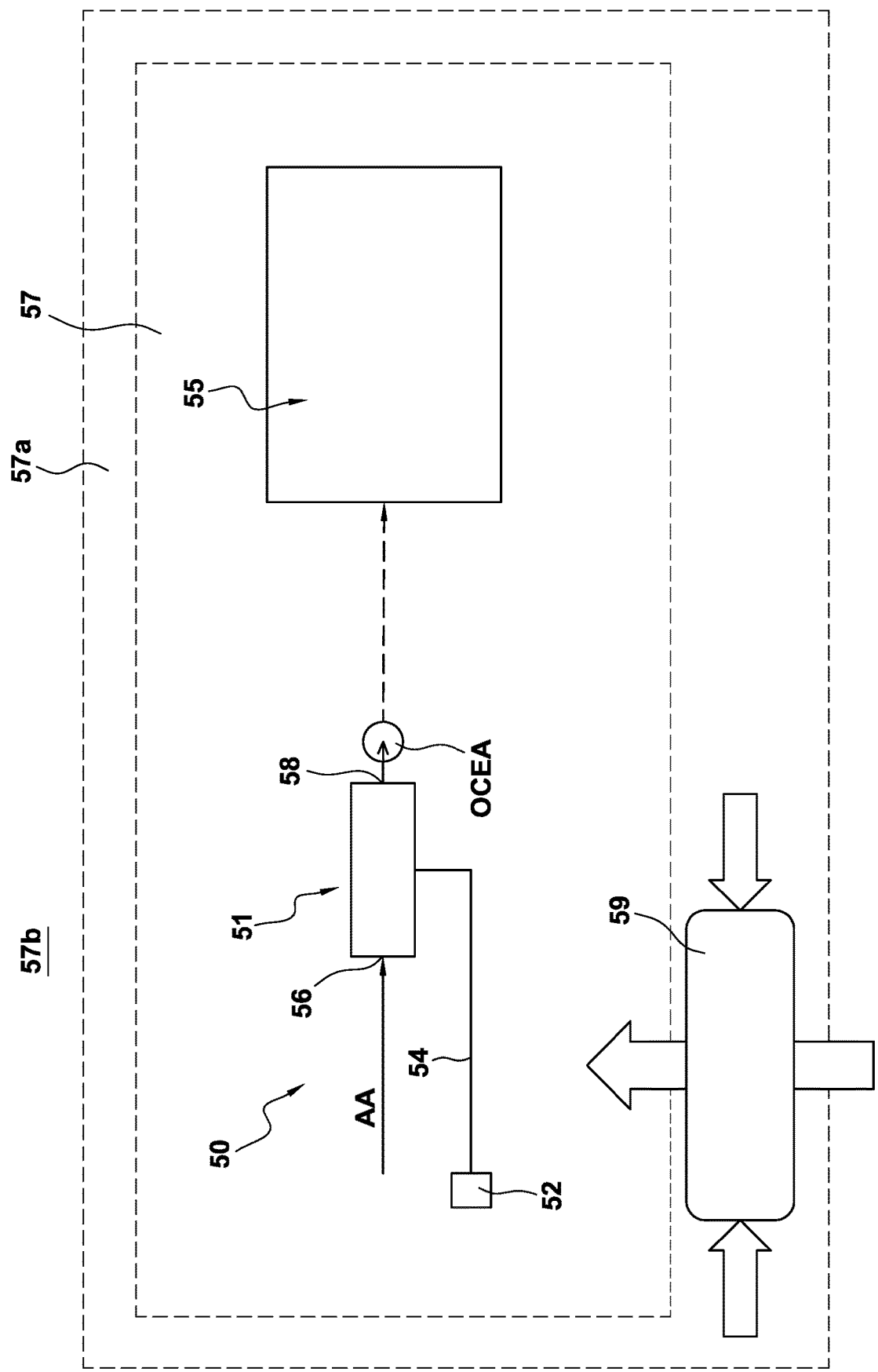
Figure 6:
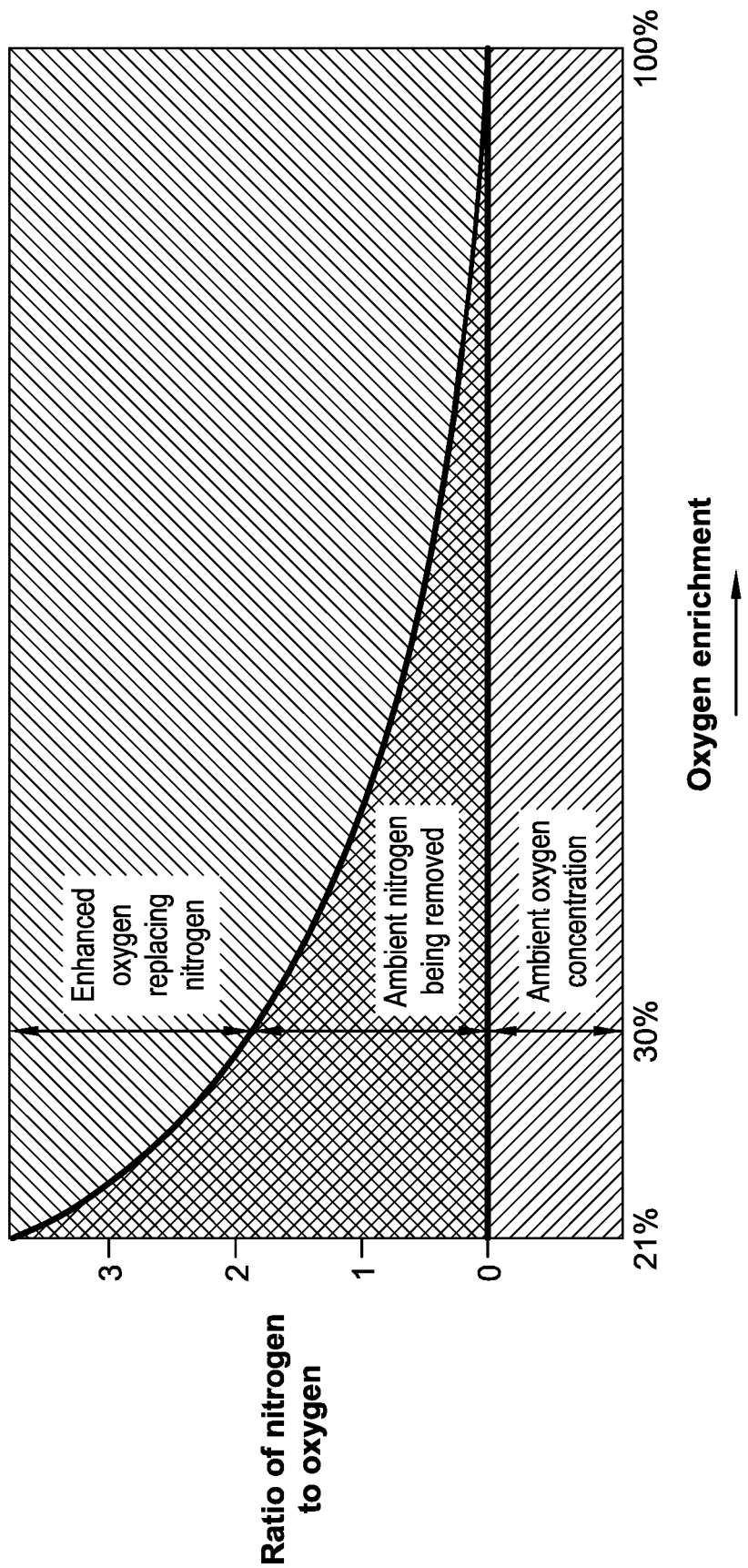
Figure 7:
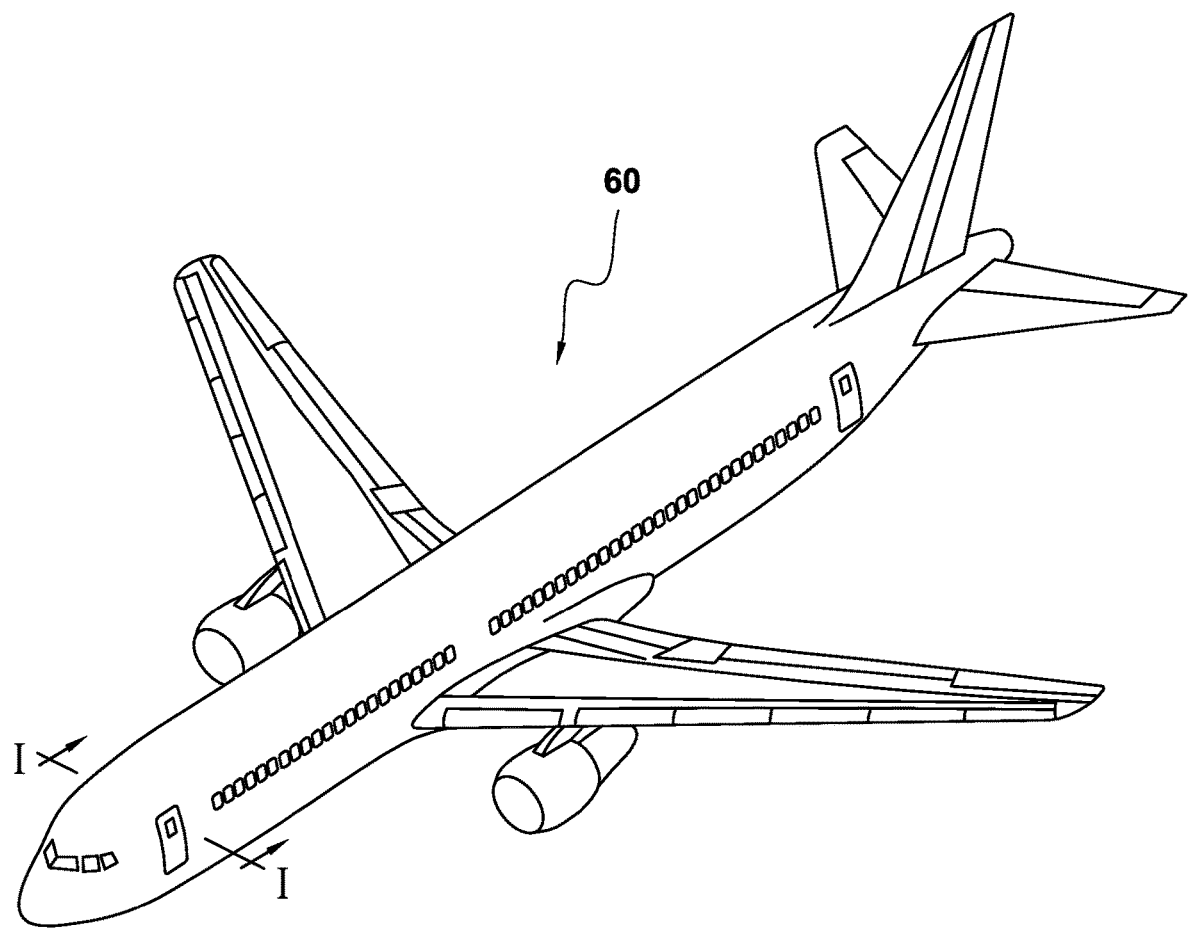
Figure 8:
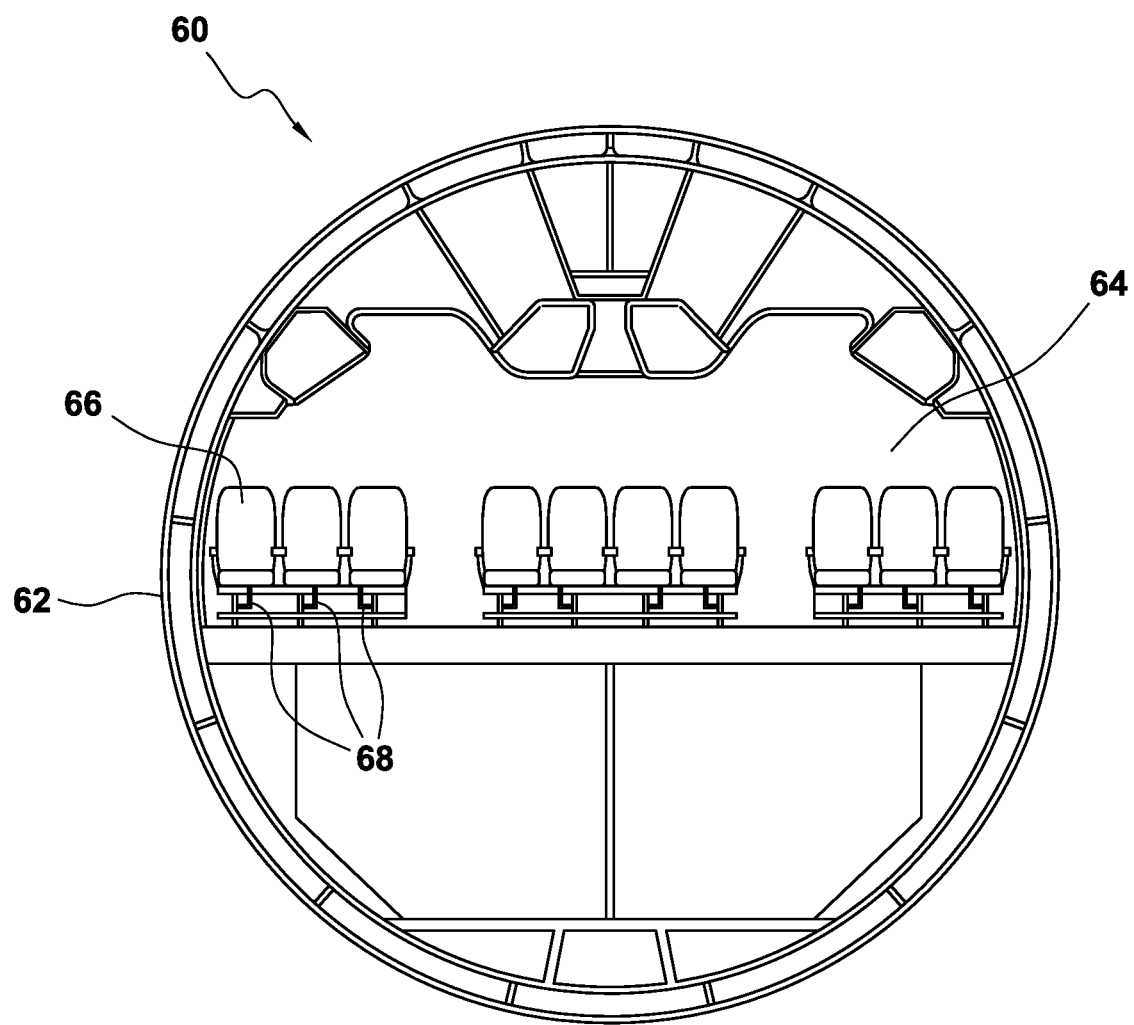
Figure 9:
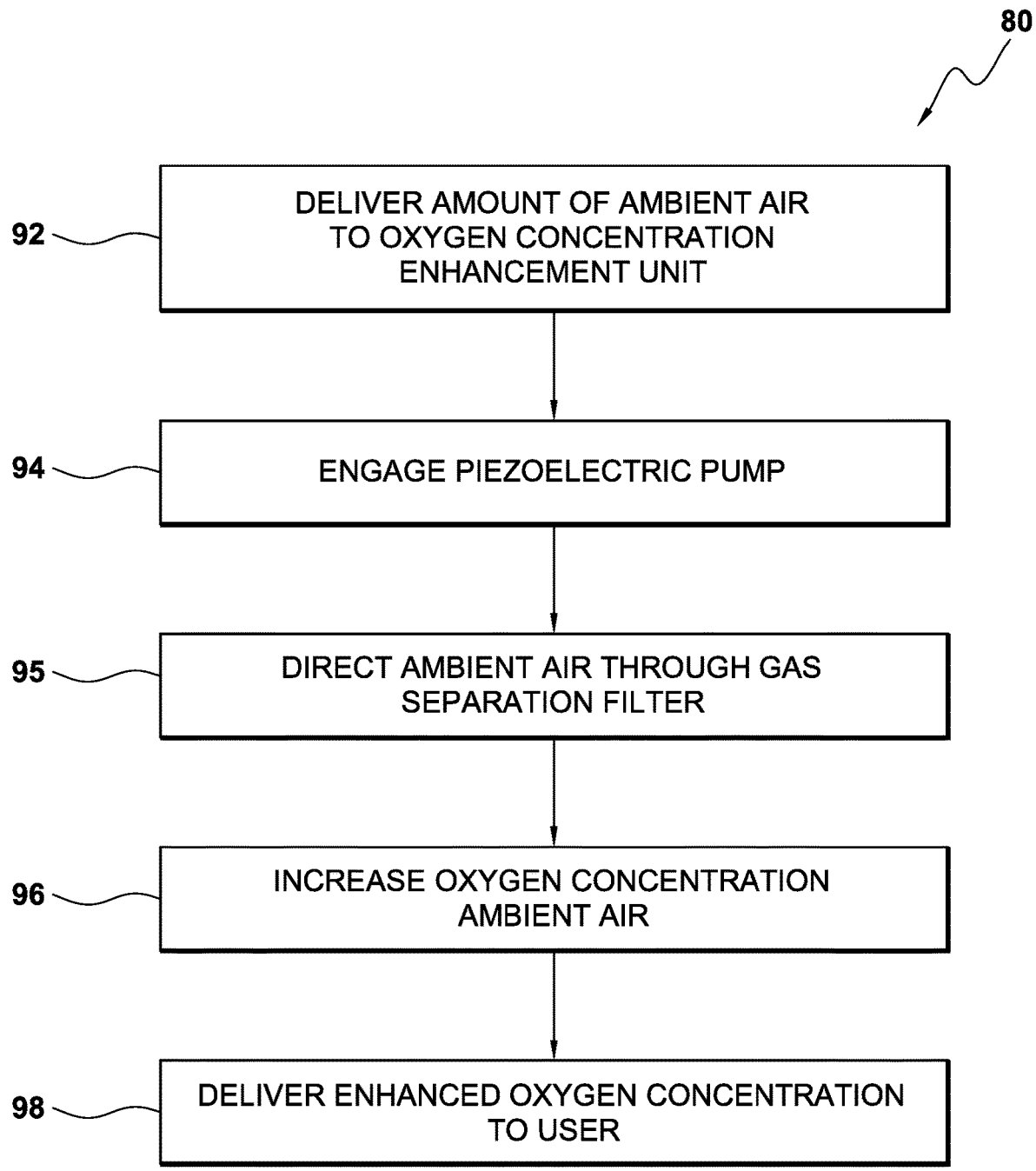

Having thus described variations of the disclosure in general terms, reference will now be made to the accompanying drawings, which are not necessarily drawn to scale, and wherein:

FIG. 1 is a perspective view of an apparatus according to an aspect of the present disclosure incorporated into a system also according to an aspect of the present disclosure;

FIG. 2 is a perspective view of an oxygen enhancement device used in the apparatuses, systems, and methods according to an aspect of the present disclosure;

FIG. 3 is a cross-sectional representative view of oxygen enhancement device shown in FIG. 2, and according to an aspect of the present disclosure;

FIG. 4 is a cross-sectional representative view of oxygen enhancement device shown in FIG. 2, and according to an aspect of the present disclosure;

FIG. 5 is a representative diagram of a system according to an aspect of the present disclosure;

FIG. 6 is a graph oxygen showing oxygen enrichment achieved as nitrogen is removed from ambient air;

FIG. 7 is a perspective view of an aircraft;

FIG. 8 is a cutaway view of the aircraft shown in FIG. 7 taken along line I-I, showing the cabin of the aircraft shown in FIG. 7; and FIG. 9 is a flowchart showing methods according to aspects of the present disclosure.

DETAILED DESCRIPTION

The present disclosure is directed to apparatuses, systems, and methods for producing and delivering to a user air having an oxygen concentration that is higher than the ambient oxygen concentration in ambient air in an environment. The apparatuses, systems, and methods disclosed herein include at least one piezoelectric pump operable to direct ambient air through at least one gas separation filter, and then direct the oxygen-enriched air to a user, proximate to a user, or to a zone inhabited by a user. In further aspects, at least one piezoelectric pump is configured to also direct ambient air at a positive pressure to apparatuses and systems (e.g., apparatuses and systems comprising the gas separation filter(s)) disclosed herein.

FIG. 1 is a representative view of an oxygen concentration enhancement system 10 according to an aspect of the present disclosure. As shown in FIG. 1, an oxygen separation unit 12 (referred to herein as unit 12) includes an inlet 12a, with unit 12 further being in communication with a power source (shown in FIG. 7) via a power cord 14 having a plug 15 (with plug 15 shown in FIG. 1 in non-limiting fashion as a Universal Serial Bus (USB) port plug) suitable for engagement with a power source (not shown in FIG. 1, but represented in non-limiting fashion in FIG. 7 as feature 68). Unit 12 includes an outlet 12b in communication with a tube 16 that is configured to direct an oxygen-enhanced airflow from unit 12 to enhanced oxygen directing device 19. As shown in FIG. 1, enhanced oxygen directing device 19 is configured in non-limiting fashion as a headset to fit onto the head 18 of a user 17. Enhanced oxygen directing device 19, as shown, comprises an enhanced oxygen directing device outlet 19a, configured to direct an oxygen enhanced airflow to the head 18 of user 17. Though not shown in FIG. 1, the power cord plug 15 may be any plug type that facilitates a connection of the oxygen concentration enhancement unit 12 to a power source (not shown in FIG. 1), including a direct current (DC) power source, such as, for example, via a USB or a battery that can be rechargeable, and that also can be contained within unit 12 or that can be in communication with unit 12 (e.g., connected to unit 12 via a power cord or cable, etc.).

While the enhanced oxygen directing device 19, is shown in FIG. 1 to be a headset, aspects of the present disclosure further contemplate any device that can direct, re-direct, concentrate, or otherwise impact the direction and/or rate of an airflow having an enhanced oxygen concentration to the immediate vicinity of user, referred to herein as a zone inhabited by a user. That is, according to aspects of the present disclosure, the headset configuration for the enhanced oxygen directing device 19, as shown in FIG. 1, releases and directs an airflow containing an enhanced oxygen concentration proximate to oral and nasal cavities of a user to facilitate inhalation of air having an enhanced oxygen concentration as compared to the oxygen concentration of ambient air. Other enhanced oxygen directing devices are contemplated where airflow is released (e.g., at a positive pressure) to an inhalation area or "zone" inhabited by users that can be more indirect and potentially less cumbersome than a headset. For example, though not shown, the present disclosure further contemplates an enhanced oxygen concentration directing device emanating directly from unit 12, and/or that can be manipulated to direct an outflow of oxygen in any desired direction. In further aspects, the directing device may be contained within the unit, such that the unit itself can be positioned proximate to a user (e.g., held by a user in a position such that an oxygen enriched airflow emitted by the unit itself can be inhaled by the user).

FIG. 2 is an enlarged perspective view of the unit 12 shown in FIG. 1. While shown as being cylindrical in shape, unit 12 can be of any shape, or housed in a housing 22 of any desirable shape (e.g., circular, rectangular, etc.). Unit 12, as shown in FIG. 2, includes an inlet end 12a and an outlet end 12b, with outlet stem 26 passing through end seal 24. The presence of a connector such as the outlet stem 26 can be obviated making the stem 26 optional, so long as the outlet of the unit is in communication with a means for directing (e.g. the tube 16 shown in FIG. 1) a treated airflow having an enhanced oxygen concentration away from the unit and to a device for directing the treated airflow to a user or a zone inhabited by a user.

In operation, as ambient air is directed into unit 12 via inlet 12a (not shown in FIG. 1), gas separation filters located within unit 12 separate and isolate components of the admitted ambient air, with the result being an increased concentration of oxygen (as compared to the oxygen concentration present in the ambient air introduced to the unit 12) in the air that is released from and otherwise directed from unit 12 as outflow via an outflow pathway 28 bounded by stem 26. According to one aspect, ambient air is directed into the unit 12, for example, by any suitable means for directing air at a positive pressure (e.g., pump, blower, etc.). Such means for directing air into or out of the unit 12 can be positioned within or proximate to the unit 12. Positive pressure refers to an air pressure value that is greater than ambient air pressure. Ambient air pressure at sea level has an accepted value of 14.7 psi. In operation, a pressure gradient is formed to facilitate entry of ambient air into the unit 12. Although means for creating positive pressure is shown in FIGS. 1-4, the apparatuses, systems, and methods disclosed herein further contemplate integrating means for establishing a negative pressure (e.g., a vacuum) that would achieve the desired result of achieving a pressure gradient to facilitate entry of ambient air into the unit 12, or any units described herein. Still further, present aspects of this disclosure contemplate the positive pressure created via the process of ambient air introduction into unit 12 exclusively or in part due to the action of one or more piezoelectric pumps located within unit 12.

FIG. 3 is a schematic diagram according to aspects of the present disclosure showing a cross-sectional perspective view of the oxygen concentration enhancement system 30 that can be incorporated into the oxygen concentration enhancement system 10 shown in FIG. 1, and further incorporating the oxygen concentration enhancement unit 12 shown in FIGS. 1 and 2. As shown in FIG. 3, unit 12 is in communication with blower 31 that is further in communication with an ambient air delivery line 32 that is, in turn, in communication with a plurality of piezoelectric pumps also referred to equivalently as piezoelectric drive pumps, and piezoelectric diaphragm pumps, with the understanding that a piezoelectric drive works in concert with, and drives, a pump mechanism (hereinafter "pumps") 34a, 34b and 34c. The pumps include a corresponding pump inlet line 33a, 33b and 33c. Each of the pumps 34a, 34b, 34c and 34d shown in FIG. 3 are positioned proximate to gas separation filters 35a, 35b and 35c respectively (hereinafter "filters"). The plurality of gas separation filters can be equivalently referred to as gas separation membranes. Examples of the piezoelectric pumps, or drives used to power the pumps as well as examples of gas separation filters are described in greater detail below.

In the illustrated aspects shown in FIG. 3, ambient air is introduced to the system 30 via the blower 31. The blower 31 can include positive pressure blowers or other devices (not shown) for the purpose of creating a pressure gradient that directs ambient air into the system 30. The positive pressure generator 31 that can be in the form of a blower (hereinafter "blower" 31) is but one example of a presently contemplated positive pressure generator able to direct ambient air into the system 30.

Ambient air has an ambient oxygen concentration. Ambient oxygen concentration refers to an amount of oxygen in the ambient air as compared to the amount of other gases present in the ambient air. The average composition of ambient air at sea level comprises comparative concentrations of about 78 mol fraction % nitrogen, and about 21 mol fraction % oxygen, with the remaining 1 mol fraction % comprising mostly argon and carbon dioxide. The presently disclosed apparatuses, systems, and methods increase, or "enhance" the oxygen concentration in ambient air by about 28% to an oxygen enriched concentration in the treated air of about 26.88 mol fraction %. According to aspects of the present disclosure, in the immediate vicinity of the point of release of the air having an enhanced oxygen concentration from the presently disclosed apparatuses and systems, a user located at, or proximate to, such point of release that inhales such oxygen enhanced air, will be inhaling air having an oxygen concentration that is enhanced by up to about 28% as compared to the ambient oxygen concentration in the ambient air otherwise present for breathing.

According to one aspect, in a presently contemplated arrangement as shown in FIG. 3, each gas separation filter treats an amount of ambient air introduced to the system 30 "in parallel" to increase the oxygen concentration initially present in the ambient air (e.g., the ambient oxygen concentration of the ambient air introduced to the system 30). That is, an amount of ambient air having an ambient oxygen concentration is directed from the ambient air delivery line into the system 30, into unit 12, and directed to one of a plurality of piezoelectric pumps 34a, 34b, or 34c. via the ambient air delivery line 32. As shown in FIG. 3, each of the piezoelectric pumps comprises or is otherwise driven by a piezoelectric pump drive. The pumps are engaged to an operating mode and air is directed by the action of the piezoelectric pumps into and through the gas separation filters 35a, 35b, 35c, and delivered from the system via the enhanced oxygen directing device 19.

More specifically, as shown in FIG. 3, air having an enhanced oxygen concentration leaves each filter 35a, 35b and 35c respectively through gas separation filter outlet lines 36b, 36c, and 36d. The gas separation filter outlet lines 36b, 36c, and 36d are in communication with (and direct the air having an enhanced concentration to) an enhanced oxygen concentration airflow line 38. The air leaving the outlet lines, and that is combined in the enhanced concentration airflow line 38, has an enhanced oxygen concentration as compared to the ambient oxygen concentration in the ambient air. In this configuration as shown in FIG. 3, the filters in unit 12 are said to be arranged "in parallel". That is, the oxygen concentration value of the air leaving each gas separation filter is substantially equivalent relative to one another.

Further describing the system shown in FIG. 3, and according to one aspect, as the ambient air enters the system 30 it is directed into the ambient air delivery line 32 that then branches off as needed along the unit 12 to introduce ambient air from the ambient air delivery line 32 respectively to a piezoelectric pumps 34a, 34b, 34c via gas separation filter inlets 33a, 33b and 33c. The piezoelectric pumps 34a, 34b, and 34c respectively direct air through system 12 and into gas separation filters 35a, 35b and 35c. Treated air that now contains an enhanced oxygen concentration (e.g., as compared to the oxygen concentration in the ambient air introduced to system 30) exits gas separation filters 35a, 35b, and 35c respectively via gas separation outlet lines 36b, 36c, and 36d. The gas separation outlet lines are each in communication with enhanced concentration airflow line 38 that is, in turn, in communication with the enhanced oxygen directing device 19.

Power for the oxygen concentration enhancement system 30 is directed from a power source (not shown in FIG. 3) to power a series of piezoelectric flow control valves. In FIG. 3, the valves controlling air input into a pump are labelled as "Vi". Valves controlling air output from the pump into the filters and from the pump to gas separation filter outlet lines 36b, 36c, and 36d are labelled as "Vo". The valves are therefore positioned across piezoelectric diaphragm pump inlets and outlets throughout the oxygen concentration enhancement system 30. The piezoelectric pumps and valves can be operably controlled and configured to at least control the rate and amount of: 1) air introduced into and directed out of the blower 31 by pump 34a; 2) ambient air directed (e.g., pumped) into the system and into the first gas separation filter by pump 44a; 3) the progressively enhanced oxygen concentrated air directed (e.g., pumped) into second and third gas separation filters by pumps 34b, 34c; and 4) the enhanced oxygen concentrated air directed (e.g. pumped) out of the system 30 by pump 34d and to the enhanced oxygen directing device 19. While such valves and pumps shown for simplicity in FIG. 3 are located outside of the unit 12, according to further aspects of the present disclosure, the piezoelectric pumps and valves can be dimensioned such that they are contained within a single unit housing as shown in FIGS. 1 and 2.

As further shown in FIG. 3, pumps 34a, 34b, 34c, 34d are powered and controlled to sustain alternating or pulsating phases or "strokes" (e.g., controlled suction and controlled compression strokes, etc.) to direct air through the unit 12 and system 30. The air moving through the unit 12, according to illustrated aspects, generally follows the direction of the arrows shown in FIG. 3. Unit 12 and system 30 can further comprise a number of pump inlet lines and/or outlet from unit 12 in excess of the number shown in FIG. 3. Similarly, any number of gas separation filters can be present in the unit 12, and any number of units 12 can be present and incorporated into the oxygen concentration enhancement system 30.

Though not shown in FIG. 3, aspects of the present disclosure further contemplate housing the entire system 30 within one or more housings. In such a system, (not shown in FIG. FIG. 3), a blower or other means for directing ambient air into the system and the ambient air intake resides within a housing. Further, in such an arrangement not shown, but presently contemplated, an enhanced oxygen concentration airflow line and an enhanced oxygen directing device will also reside within a system's housing.

The piezoelectric pumps in concert with the piezoelectric pump valves are responsible for directing airflow into, through and out of the unit 12 and across system 30. That is, the piezoelectric pumps are configured to at least control the rate and amount of: 1) the ambient air introduced into the system 30 (e.g., by the blower 31, etc.); 2) the amount and rate of ambient air pumped by pump 34a from pump inlet line 33a; pump 34b from pump inlet line 33b; pump 34c from pump inlet line 33c, etc.; 3) the amount and rate ambient air introduced and pumped into gas separation filters 35a, 35b and 35c to form air having an enhanced oxygen concentration; and 4) the rate and amount of oxygen concentration enhanced air directed out of the gas separation filters and into the enhanced oxygen concentration airflow line 38 and to the enhanced oxygen directing device 19 and out of the system 30.

That is, as the ambient air that is introduced into a gas separation filter from the ambient air delivery line 32 proceeds into the unit 12, the air will engage a series of valves and pumps directing the ambient air into the gas separation filters for the purpose of enriching the oxygen concentration of the ambient air.

Such oxygen concentration enhancement occurs, not by introducing any additional oxygen to the oxygen concentration enhancement system 30, but by separating an amount of non-oxygen components from ambient air that is treated in the oxygen concentration enhancement system 30. Such treatment of the ambient air in the gas separation filters forms an enhanced oxygen concentration in the airflow. This treatment results in an increase in the relative oxygen concentration in the air treated in the oxygen concentration enhancement system 30 (e.g., as compared to the oxygen concentration in the ambient air outside of the oxygen concentration enhancement system 30). The operation of the gas separation filters will be more fully discussed below.

Further, according to one aspect, the gas separation filters may be one continuous gas separation device, or a series of thin and substantially flat or planar gas separation devices configured to be rolled onto itself, or themselves, and/or about a single axis. In this rolled configuration, the gas separation device, or devices would progressively treat the air introduced into the gas separation device(s) to progressively enhance and increase the oxygen concentration of the air progressing through the gas separation device(s), as non-oxygen components from the air are removed from the air in the gas separation device(s).

Referring again to FIG. 3, ambient air having an ambient oxygen concentration is introduced into the unit 12 is directed to gas separation filter inlets 33a, 33b, and 33c for treatment to remove an amount of non-oxygen-containing components in the ambient air, thus increasing or enhancing the oxygen concentration in the treated air. The air that has been treated and has had its oxygen concentration enhanced by the gas separation filters 35a, 35b, and 35c is directed to gas separation filter outlets 36b, 36c, and 36d. As shown in FIG. 3, the outlets 36b, 36c and 36d direct the enhanced oxygen concentration air flow to enhanced oxygen concentration air flow line 38. The enhanced oxygen concentration air flow line 38 is in communication with the enhanced oxygen directing device 19 that is responsible for and configured to direct the air having an enhanced oxygen concentration to a user or zone inhabited by a user.

FIG. 4 is a schematic diagram showing a cross-sectional perspective view of a "serial" oxygen concentration enhancement system 40 comprising an oxygen concentration enhancement unit 13 (hereinafter referred to as "unit 13") that can be incorporated into the oxygen concentration enhancement systems shown in FIG. 1, and that features oxygen concentration enhancement filters arranged "in series" as opposed to and in contrast with the parallel system shown in FIG. 3. That is, an essential difference between unit 12 and unit 13 is the addition of manifolds or other connections in the unit 13 that direct an airflow containing air having a progressively enriched oxygen concentration through the system 40 from one gas separation filter to the next, (e.g., oxygen concentration is enriched "in series" rather than a parallel filter orientation as shown in FIG. 3).

In this way, ambient air is directed to a first gas separation filter that treats the ambient air and increases the oxygen concentration of the ambient air. The "once-treated" air is directed from a first gas separation filter outlet to a second gas separation filter inlet of a second gas separation filter. The once-treated air is converted to "twice-treated air" in the second gas separation filter. The twice-treated air has a higher oxygen concentration than the first-treated air, and as the air is progressively treated, the air leaving each successive filter has a higher oxygen concentration. As shown in FIG. 4, the process is continued progressively as into a third gas separation filter, although a different number of gas separation filters other than the three shown in FIG. 4 are also contemplated according to aspects of the present invention. Such a "series" orientation is described in detail below.

As shown in FIG. 4, unit 13 is in communication with blower 31 that is further in communication with an ambient air delivery line 42 that is in turn in communication with a piezoelectric pump (hereinafter "pump" or "pumps") 44a. In the illustrated aspects as shown in FIG. 4, ambient air is introduced to the system 40 via the blower 31. The blower 31 is but one example of a positive pressure generator able to create a pressure gradient, and the blower 31 can include or be replaced by any device able to create a pressure gradient that directs ambient air into, or facilitates the introduction of ambient air into the system 40.

The ambient air introduced to the system 40 has an ambient oxygen concentration. Again, ambient oxygen concentration refers to an amount of oxygen in the ambient air as compared to amount of other gases present in the ambient air. As shown in FIG. 4, the first gas separation filter 45a treats an amount of ambient air introduced to the system 40 to form a "once-treated" amount of ambient air. Each successive gas separation filter 45b, 45c increases the oxygen concentration in the ambient air originally introduced into the system 40 to an oxygen concentration that is enhanced to a predetermined percentage beyond the percentage of oxygen present in the previous gas separation filter. That is, an amount of ambient air having an ambient oxygen concentration is directed from the ambient air delivery line 42 to a first gas separation filter 45a to form an amount of "once-treated" air. The once-treated air is directed by pumps 44b, 44c from the first gas separation filter 45a to the second gas separation filter 45b via first manifold 46a to form an amount of "twice-treated" air. The twice-treated air is then directed by pumps 44d, 44e from the second gas separation filter 45b to the third gas separation filter 45c via second manifold 46b to form an amount of that has been treated three times.

As shown in FIG. 4, air is driven through the gas separation filters sequentially by piezoelectric pump drives (e.g. "pumps") associated with and in communication with each gas separation filter. That is, air having a progressively enhanced oxygen concentration leaves each filter 45a, 45b and 45c. Gas separation filter partition seals 47 are shown positioned throughout unit 13.

As shown in FIG. 4, the gas separation filter outlet line 46c leaving the third gas separation filter 45c directs the now three-times enhanced oxygen concentration air flow to the enhanced oxygen directing device 19 that is responsible for and configured to direct the air having an enhanced oxygen concentration to a user or zone inhabited by a user. In this configuration, as shown in FIG. 4, the filters in unit 13 are said to be arranged "in series". That is, the oxygen concentration value (e.g., oxygen percentage in the air) of the air leaving each filter is progressively increased by treatment in a subsequent gas separation filter.

Power for the oxygen concentration enhancement system 40 is directed from a power source (not shown in FIG. 4) to power a series of piezoelectric flow control valves. In FIG. 4, the valves controlling air input into a pump is shown as valves labelled "Vi". Valves controlling air output from the pump and into the sequential gas separation filters oriented in series 45a, 45b, 45c and from the filters to the manifolds 46a, 46b and to the enhanced oxygen directing device 19 are shown as valves labelled "Vo". The piezoelectric flow control valves Vo, Vi are therefore positioned across piezoelectric diaphragm pump inlets and outlets throughout the oxygen concentration enhancement system 30, 40.

In FIG. 4, the piezoelectric drives, including the pumps and valves are shown residing within a housing 41. While the first and second manifolds 46a, 46b are shown extending beyond the boundary of the housing 41, aspects of the present disclosure further contemplate such manifolds residing within the boundary of the housing 41, such that the system 40 is contained within housing 41, with the exception of the ambient air delivery line 42 and the enhanced oxygen concentration airflow line 48 and the enhanced oxygen directing device 19 that are shown to reside outside of the housing. Though not shown in FIG. 4, aspects of the present disclosure further contemplate housing the entire system within one or more housings. In such a system, (not shown), a blower or other means for directing ambient air into the system and the ambient air intake resides within a housing. Further, in such an arrangement not shown, but presently contemplated, both an enhanced oxygen concentration airflow line and an enhanced oxygen directing device will also reside within a system's housing.

As with system 30 shown in FIG. 3, in system 40 shown in FIG. 4, the piezoelectric pumps 44a, 44b, 44c, 44d, 44e, 44f are operably synchronized or otherwise controlled in concert with one another and are responsible for directing airflow into, through and out of the unit 13 and across system 40. That is, the piezoelectric pumps and valves Vi, Vo can be operably controlled and configured to at least control the rate and amount of: 1) air introduced into and directed out of the blower 31 by pump 44a; 2) ambient air directed (e.g., pumped) into the system and into the first gas separation filter by pump 44a; 3) the progressively enhanced oxygen concentrated air directed (e.g., pumped) into second and third gas separation filters by pumps 44b, 44c, 44d and 44e; and 4) the enhanced oxygen concentrated air directed (e.g. pumped) out of the system 40 by pump 44f and to the enhanced oxygen directing device 19 and out of the system 40.

As with system 30 shown in FIG. 3, in system 40 (shown in FIG. 4) such oxygen concentration enhancement occurs, not by introducing any additional oxygen to the oxygen concentration enhancement system 40, but by separating an amount of non-oxygen components from ambient air that is then treated in the oxygen concentration enhancement system 40, resulting in an increase in the relative oxygen concentration in the air treated in the oxygen concentration enhancement system 40 as compared to the oxygen concentration in the ambient air outside of the oxygen concentration enhancement system 40. The operation of the gas separation filters in system 40 will be more fully discussed below.

As further shown in FIG. 4, pumps 44a, 44b, 44c, 44d, 44e, and 44f are powered and controlled to sustain alternating or pulsating phases or "strokes" (e.g., controlled suction and controlled compression strokes, etc.) to direct air through the unit 13 and system 40. The air moving through the unit 13, according to illustrated aspects, generally follows the direction of the arrows shown in FIG. 4. FIG. 4 further shows unit 13 and system 40 comprising a single pump inlet line and a single outlet to a directing device. While not shown in FIG. 4, unit 13 and system 40 can further comprise a number of pump inlet lines and/or outlet from unit 13 in excess of the number shown in FIG. 4. Similarly, any number of gas separation filters can be present in the unit 13, and any number of units 13 can be present and incorporated into the oxygen concentration enhancement system 40.

Further, according to one aspect, the gas separation filters present in system 40 can be one continuous gas separation device, or a series of thin and substantially flat or planar gas separation devices configured to be rolled onto itself, or themselves, and/or about a single axis. In this rolled configuration, the gas separation device, or devices would progressively treat the air introduced into the gas separation device(s) to progressively enhance and increase the oxygen concentration of the air progressing through the gas separation device(s), as non-oxygen components from the air are removed from the air in the gas separation device(s).

Referring again to FIG. 4, ambient air having an ambient oxygen concentration is introduced into the unit 13 is progressively directed to a plurality of gas separation filters (e.g., in series) for treatment to remove an amount of non-oxygen-containing components in the ambient air, thus progressively increasing or enhancing the oxygen concentration in the treated air that is finally directed from the unit 13 and system 40 to an enhanced oxygen directing device 19 that is responsible for and configured to direct the air having an enhanced oxygen concentration to a user or to a zone or region inhabited by a user located proximate to the unit 13.

Regarding both systems 30 and 40, aspects of the present disclosure further contemplate that an enhanced oxygen concentration directing device emanating directly from unit 12 and 13, and/or that can be manipulated to direct an outflow of oxygen in any desired direction. In further aspects, the directing device may be contained within the unit, such that the unit itself can be positioned proximate to a user (e.g., held by a user in a position such that an oxygen enriched airflow emitted by the unit itself can be inhaled by the user).

FIG. 5 is a schematic diagram further outlining aspects of the present disclosure. As shown in FIG. 5, an oxygen concentration enhancement system 50 comprises an oxygen concentration enhancement unit 51 (hereinafter "unit 51") in communication with a power source 52 via a power cord 54. The oxygen concentration enhancement unit 51 may be either system 30 or 40 shown in FIGS. 3 and 4, respectively. System 50 can incorporate the systems and apparatuses outlined in FIGS. 1-4. Ambient airflow "AA" is directed into the unit 51 in the direction of the arrow at an oxygen concentration enhancement unit intake 56. The oxygen concentration is enhanced within the unit 51 according to mechanisms described above that take place within the unit 51. An oxygen concentration enhanced airflow, labelled as "OCEA" in FIG. 5, is then directed from the oxygen concentration enhancement unit outlet 58 in the direction of the arrow to the immediate, or proximate vicinity of a user 55, or to a zone inhabited by a user 55. As shown in FIG. 5, the user 55 inhabits a space in an aircraft passenger cabin 57 that is set within an aircraft 57b. A passenger cabin air conditioner 59 conditions air from within the passenger cabin 57 or from an area 57a between the passenger cabin 57 and an aircraft fuselage 57a. As shown in FIG. 5, the overall oxygen content in the aircraft passenger cabin 57 is not affected by the air having an enhanced oxygen concentration that is released by the unit 51. According to an aspect of the present disclosure, oxygen already in an environment, such as an aircraft, is repurposed or reconditioned and has its concentration temporarily altered at isolated locations to allow a user to receive air having an enhanced oxygen concentration in the aspirated air that is consistent with or that exceeds oxygen concentrations experienced by a user on land, for example, at sea level.

According to further aspects of the present disclosure, gas separation devices (e.g. gas separation filters, etc.) that can enhance oxygen concentration by: 1) separating oxygen; 2) separating nitrogen; and/or 3) separating both nitrogen and oxygen from ambient air are contemplated, so long as the selected process will have the desired effect of enhancing oxygen concentration in a resultant airflow exiting the gas separation device. FIG. 6 is a graph showing the comparative ratio of nitrogen to air in ambient air and showing that, as nitrogen is removed from ambient air (e.g., by a gas separation filter of the type disclosed herein, the overall oxygen concentration in the air treated and released by units comprising such gas separation filters will increase, thus enriching or enhancing the oxygen concentration of the ambient air initially introduced into the units. That is, the air released by the units of the present disclosure, to an immediate vicinity of a user will have a desired and predetermined enhanced oxygen concentration.

Without being bound to any particular theory, according to aspects of the present disclosure, the oxygen concentration enhancement units described herein can comprise a type of oxygen separation membrane technology that uses a spiral type gas separation membrane module where a flat film gas separation membrane is wound around, for example, a core tube. Air is preferably delivered to the separation membrane via a blower, or by creating a vacuum to induce a required airflow into the gas separation device. Useful gas separation devices include, without limitation, for example, gas separation cartridges manufactured by Ube Industries, Ltd., (Yamaguchi, Japan), although any gas separation device able to produce the desired oxygen concentration enhancement, and that can be used by achieving adequate pressure gradients via micro-pumps powered by piezoelectric devices are contemplated by the present disclosure.

The systems and apparatuses of the present disclosure are thought to be particularly useful as personal devices that can be portable. Such presently contemplated devices and systems include those systems comprising component miniaturization, or at least comprising components scaled in size and dimension to facilitate assembly of a device and for personal use. Therefore the overall useful weight of an assembled oxygen concentration enhancement device according to further non-limiting aspects of the present disclosure can usefully range from about 0.5 pounds to about 5 pounds in weight, more preferably ranging from about 1 pound to about 3 pounds in weight.

The portability of the systems and apparatuses according to aspects of the present disclosure further contemplate incorporating a desired number of suitable piezoelectric-driven pumps and valves as well as power and control systems that generate enough energy to operate and control the pumps and valves used to generate adequate airflow through the apparatuses and systems of the present disclosure. Such piezoelectric pumps include, without limitation, for example, diaphragm micro-pumps manufactured by TFS (Takasago Fluidic Systems—Westborough, Mass.); Servoflo (Lexington, Mass.); Such diaphragm micro-pumps driven by piezoelectric elements according to further non-limiting aspects of the present disclosure individually can achieve a standard oxygen flow rate ranging from about 10 to about 100 ml $O_2$/min, and more preferably ranging from about 20 to about 40 ml $O_2$/min. through a 1 mm thick membrane at ambient pressure and operating at ambient temperature. A plurality of micro-pumps and gas separation filters can also be oriented in series or in parallel as described above to achieve desired and predetermined flow rate ranges.

The presently contemplated diaphragm micro-pumps driven by piezoelectric elements, according to aspects of the present disclosure, can further individually achieve a maximum pumping pressure ranging from about 26 kPa to about 45 kPa, or can be oriented in series or in parallel to achieve desired and predetermined pressure ranges. According to further non-limiting aspects of the present disclosure, the overall dimension of such diaphragm micro-pumps driven by piezoelectric elements can range from about 25×25×4.8 mm to about 33×33×9 mm (length×width×height).

Suitable piezoelectric drive pumps and controllers are further contemplated for use with the above-identified components. In addition, contemplated diaphragm micro-pumps can have drivers and controllers incorporated into the units and systems such that airflow rates and pressures can be preset, can be adjustable, or can be set by an external control signal that can be remotely generated. Further, the drives contemplated for use in the present disclosure include those that can send or receive signals to a remote controller, including a wireless controller, that is in communication with, for example, an automated computer program, or that can be controlled in response to manual commands.

Aspects of the present disclosure further include various methods and processes implemented using various hardware configured in ways that can vary as desired. For instance, one or more processing functionality can be implemented using dedicated hardware, rather than a microprocessor configured with program instructions, depending on, e.g., the design and cost tradeoffs for the various approaches, and/or system-level requirements.

According to a further aspect, when the disclosed oxygen concentration enhancement devices and systems are constructed and dimensioned to be useful as personal and portable devices, self-containment into a single unit is contemplated. The contemplated oxygen concentration enhancement devices, units and systems can be powered with, for example, self-contained DC/battery power that is preferably rechargeable and can be integrated into the units, or powered by AC such that the unit can be engaged via suitable cord or wire to a power source.

In various embodiments, the devices described and set forth herein, and shown, for example, in FIGS. 1-5 may be configured for use in an enclosed space, such as in a passenger aircraft. FIG. 7 shows an aircraft 60. FIG. 8 is a cross-sectional view of aircraft 60 taken along line I-I in FIG. 7. As shown in FIG. 8, an aircraft fuselage 62 separates the exterior of the aircraft from an aircraft interior 64. Seats 66 are shown with power sources 68 oriented beneath seats 66 and into which the systems and apparatuses of the present disclosure can be engaged to power such systems and apparatuses.

FIG. 9 is flowchart outlining a contemplated method 80 comprising delivering an amount of ambient air 92 to an inlet of an oxygen concentration enhancement unit, with the oxygen concentration enhancement unit comprising at least one piezoelectric pump in communication with at least one gas separation filter and engaging 94 the piezoelectric pump. An amount of ambient air is directed 95 through the gas separation filter, and increasing 96 the ambient oxygen concentration in the ambient air introduced into the unit to form an amount of enhanced oxygen concentration airflow in the oxygen separation device, and delivering 98 air having an enhanced oxygen concentration as compared to the oxygen concentration in ambient air from the unit, for example, to a user.

Aspects of the present disclosure find use in a variety of potential applications, particularly in the transportation industry including, for example, aerospace, marine, automotive applications and other application where purified oxygen or air having an enhanced oxygen concentration exceeding the oxygen concentration in ambient air is desired.

The disclosed personal and preferably portable devices, systems and methods for delivering oxygen to a user, toward the nasal and oral cavities or a user, or to a zone proximate to and inhabited by a user. The oxygen is delivered at an enhanced concentration that is beyond the oxygen concentration found in ambient air also may be usefully employed in enclosed or partially enclosed spaces including, for example vehicles, including manned and unmanned aircraft, manned and unmanned spacecraft, manned and unmanned rotorcraft, manned and unmanned terrestrial vehicles, manned and unmanned surface water borne vehicles, manned and unmanned sub-surface water borne vehicles, satellites, etc.

Aspects of the present disclosure can, of course, be carried out in other ways than those specifically set forth herein without departing from essential characteristics of aspects disclosed herein. The presently disclosed aspects are to be considered in all respects as illustrative and not restrictive, and all changes coming within the meaning and equivalency range of the appended claims are intended to be embraced therein.

What is claimed is:

1. An apparatus comprising:
a single oxygen concentration enhancement unit contained within a single housing, said oxygen concentration enhancement unit comprising:
an inlet;
a plurality of gas separation filters in communication with an ambient airflow in an enclosed space via the inlet, said ambient airflow comprising an ambient oxygen concentration in the ambient airflow, said oxygen concentration in the ambient airflow comprising an oxygen concentration below an oxygen concentration in air occurring at sea level;
a piezoelectric pump in communication with at least one of the gas separation filters; and
an outlet configured to emit an enhanced oxygen concentration airflow from the oxygen enhancement unit to a zone inhabited by a user.

2. The oxygen concentration enhancement unit of claim 1, further comprising:
a positive pressure generator in communication with the inlet.

3. The oxygen concentration enhancement unit of claim 2, wherein:
the piezoelectric pump is in communication with the positive pressure generator.

4. The oxygen concentration enhancement unit of claim 1, wherein the gas separation filters are replaceable.

5. The oxygen concentration enhancement unit of claim 1, further comprising a power source in communication with the piezoelectric pump.

6. The oxygen concentration enhancement unit of claim 1, wherein the plurality of gas separation filters is configured to operate in parallel.

7. The oxygen concentration enhancement unit of claim 1, wherein the plurality of gas separation filters is configured to operate in series.

8. The oxygen concentration enhancement unit of claim 1, wherein the unit is portable.

9. A system comprising:
a single oxygen concentration enhancement unit within a single housing, said oxygen concentration enhancement unit comprising:
a plurality of gas separation filters, each of said gas separation filters comprising:
an inlet configured to admit an ambient airflow having an ambient oxygen concentration;
a piezoelectric pump in communication with the gas separation filter; and
an outlet for emitting an enhanced oxygen concentration airflow to an enclosed space;
a delivery device in communication with the outlet; and
a power source in communication with the piezoelectric pump.

10. The system of claim 9, further comprising:
a positive pressure generator in communication with the inlet.

11. The system of claim 9, wherein the system is portable; and
wherein the oxygen concentration enhancement unit is configured to deliver an increased oxygen concentration to a zone proximate to a user inhabiting said zone to increase the oxygen concentration of air aspirated by the user inhabiting the zone, with the oxygen concentration of air aspirated by the user inhabiting the zone consistent with an oxygen concentration at sea level.

12. A vehicle comprising the system of claim 9, wherein the vehicle is a manned rotorcraft, an unmanned rotorcraft, a manned terrestrial vehicle, an unmanned terrestrial vehicle, a manned surface water borne vehicle, an unmanned surface water borne vehicle, a manned sub-surface water borne vehicle or an unmanned sub-surface water borne vehicle.

13. The vehicle of claim 12, wherein the vehicle comprises a passenger aircraft cabin.

14. A method comprising:
delivering an amount of ambient air having an ambient oxygen concentration to an oxygen concentration enhancement unit, said oxygen concentration enhancement unit comprising within a single housing a plurality of gas separation filters and a piezoelectric pump in communication with at least one of said gas separation filters;
engaging the piezoelectric pump to direct an airflow through the at least one of said gas separation filters;
directing ambient air into the at least one of said gas separation filters to form an enhanced oxygen concentration airflow;
increasing an oxygen concentration of the ambient air delivered to the unit to an oxygen concentration exceeding the ambient oxygen concentration in the ambient air; and
delivering the enhanced oxygen airflow from the oxygen concentration enhancement unit to an enclosed space at a flow rate ranging from about 10 to about 100 ml $O_2$/min.

15. The method of claim 14 further comprising:
delivering the enhanced oxygen airflow from the oxygen concentration enhancement unit to a predetermined location proximate to a user.

16. The method of claim 14, further comprising:
delivering an amount of ambient air at a positive pressure to the oxygen concentration enhancement unit.

17. The method of claim 14, further comprising:
controlling the ambient air delivery to the oxygen concentration enhancement unit using the piezoelectric pump.

18. The method of claim 14, further comprising:
delivering the enhanced oxygen airflow from the oxygen concentration enhancement unit to an immediate vicinity of a user.

19. The oxygen concentration enhancement unit of claim 1, wherein the outlet is in communication with a delivery device, said delivery device configured to deliver the enhanced oxygen concentration airflow from the oxygen concentration enhancement unit to the zone inhabited by the user; and
wherein the oxygen concentration enhancement unit is configured to deliver an increased oxygen concentration to the zone inhabited by the user to increase the oxygen concentration of air aspirated by the user inhabiting the zone, with the oxygen concentration of air aspirated by the user inhabiting the zone increased to an oxygen concentration at sea level.

20. The system of claim 9, wherein the enhanced oxygen airflow is delivered from the oxygen concentration enhancement at a flow rate ranging from about 10 to about 100 ml $O_2$/min.

* * * * *